United States Patent [19]

Kim et al.

[11] Patent Number: 5,645,907
[45] Date of Patent: Jul. 8, 1997

[54] ORGANIC OPTICAL RECORDING MEDIUM AND METHOD FOR THE PREVENTION OF REWRITE THEREIN

[75] Inventors: Jung Hoi Kim; Young Jae Heo, both of Seoul; Tae Young Nam, Suwan, all of Rep. of Korea

[73] Assignee: Cheil Synthetics, Inc., Kyoungsangbuk-do, Rep. of Korea

[21] Appl. No.: 362,385

[22] Filed: Dec. 22, 1994

[30] Foreign Application Priority Data

Feb. 28, 1994 [KR] Rep. of Korea ............... 94-3803

[51] Int. Cl.$^6$ ............................................. D32B 3/00
[52] U.S. Cl. ................... 428/64.1; 428/64.2; 428/64.4; 428/64.8; 428/64.9; 428/913; 430/270.14; 430/495.1; 430/945; 369/283; 369/288
[58] Field of Search ....................... 428/64.2, 64.4, 428/64.8, 64.9, 913; 369/275.1, 283, 288; 430/270, 495, 945, 270.1, 270.11, 270.14

[56] References Cited

U.S. PATENT DOCUMENTS

| | | | |
|---|---|---|---|
| 4,270,130 | 5/1981 | Houle et al. | 346/77 E |
| 4,600,625 | 7/1986 | Abe et al. | 428/167 |
| 4,626,496 | 12/1986 | Sato | 430/270 |
| 4,767,693 | 8/1988 | Oba et al. | 430/270 |
| 5,080,946 | 1/1992 | Takagisi et al. | 428/64 |
| 5,219,707 | 6/1993 | Nambs | 430/270 |
| 5,348,841 | 9/1994 | Tao et al. | 430/270 |

FOREIGN PATENT DOCUMENTS

| | | |
|---|---|---|
| 61119748 | 6/1987 | Japan . |
| 63-218398 | 9/1988 | Japan . |

*Primary Examiner*—Patrick Ryan
*Assistant Examiner*—Elizabeth Evans
*Attorney, Agent, or Firm*—Saliwanchik, Lloyd & Saliwanchik

[57] ABSTRACT

There is provided a WORM type organic optical recording media comprising a recording layer, a reflective layer and a protective layer which are formed in sequence on a substrate, the recording layer consisting of near infrared absorbing dye able to absorb a laser beam and to generate heat and of a thermosetting or photocuring resin. The organic optical recording medium can be prevented from being rewritten by heating up to 50° C. or irradiating with a UV light, said dye being capable of absorbing near infrared rays and generating heat.

The medium exhibits stable reading characteristics of at least 45 dB even after irradiating with a light with a short wavelength. In addition, it also has a function of record locking by curing the resin of the recording layer, so that, once recorded, rewrite or additional recording is not allowed therein. Consequently, it is of high data storage density, high data rates and long data archival capabilities, useful as a medium for recording a variety of information or pictures.

4 Claims, 1 Drawing Sheet

ORGANIC OPTICAL RECORDING MEDIUM AND METHOD FOR THE PREVENTION OF REWRITE THEREIN

BACKGROUND OF THE INVENTION

1. Field of the Invention

The present invention relates, in general, to an organic optical data storage medium which is recordable and readable by using a light source of laser and, more particularly, to an organic optical recording medium with high data storage density, high data rates and long data archival capabilities, useful as a medium for recording a variety of information or pictures.

2. Description of the Prior Art

A variety of information is explosively increased in an information-intensive society. Such information explosion requires recording media to be more high in data storage density and data rate and to be faster in operation.

Currently, the practical or commercial techniques for recording data are based substantially on magnetic recording technology. In general, the data are stored on magnetic media, such as video tapes, audio tapes, floppy disks and the like, on which information is recorded depending on the direction of magnetization of magnetic substances in the magnetic recording medium.

While the magnetic recording technology is commercially successful and advantageous, a recording technique known generically as optical recordings has been and continues to be considered a very promising alternative for data storage, as a recording medium with higher capacity is demanded according to the enormous amount of information resulting from the development of society.

A magneto-optical recording medium comprises a recording layer magnetizable in a plane perpendicular to the plane of the layer itself, in contrast with a magnetic medium. In addition, the coercive force of a magneto-optical recording medium, which is the ability to remain in the magnetized state, is about 5 to 10 times as high as that of a magnetic medium. Accordingly, it is very difficult to change the previous direction of magnetization with an external magnetic field.

The recording of information on a magneto-optical recording layer is effected by first focusing a modulated laser beam on a surface of the layer within 1 µm in diameter, the laser beam power being sufficient to heat the layer locally, for example, to the Curie temperature point of the layer. In this state, the direction of magnetization can be changed with an external magnetic field, so as to record information on the layer according to the direction of magnetization.

When the information is recorded by this method, the recorded unit of information comes to be reduced into 1 µm or less. Accordingly, the recording density of magneto-optical recording medium is 10 to 1,000 times greater than that of conventional magnetic recording medium. In addition, the magneto-optical medium employs a non-contact reading method, so that magneto-optical recording potentially has significant advantages over magnetic recording, including easier data preservation and longer data archival capability.

However, there are many disadvantages in producing the magneto-optical recording medium used in such method. For example, heavy metals are used as magnetic substances and a very expensive vacuum deposition or sputtering apparatus is required.

Many attempts have been made to solve such disadvantages. One of the attempts is to develop an organic optical recording material. The organic optical recording material may be grouped into either a Write Once Read Many (hereinafter, referred to as "WORM") type and a rewritable type, on the basis of the erasability of the material. On the WORM type material, only readout of information is possible after recording data once, whereas, on the rewritable type material, erasure of the data is also possible after recording.

WORM type medium is manufactured, as disclosed in Japanese Patent Laid-Open Publication Nos. Sho. 57-46362, 58-197088, 59-5096 and 63-179792, by coating light-absorbing dye admixed with polymer on a reflective layer to form a recording layer and overcoating a protective layer on the recording layer. To write a data bit in this optical recording system, a laser beam is focused on a very small spot of the recording layer, for example, within 1 µm in diameter. As a result, the light-absorbing dye generates heat, which decomposes the polymer to form a pit. Reading of the recorded information (logic 1 or 0) is effected by using the difference between the reflectivity due to presence and absence of the pit. Since WORM type material has a recorded portion which is in a state of polymer decomposition, it is impossible to record data on the polymer-decomposed portion after erasing the information.

Rewritable type material has been vigorously researched and the research has been directed to formation and erasure of bumps or pits or to use of liquid crystals or phase changes (Japanese Patent Laid-Open Publication Nos. Sho. 58-199345, 63-74135, 3-256241, 3-256242 and 3-266235). Of these, a method of utilizing bumps is extensively applied. In the method of utilizing bumps, recording is accomplished by thermally expanding a dye-dispersed organic polymer by a recording laser, to produce bumps and maintaining their shapes.

Technologies for such rewritable type materials employing the organic dye are described in many patents including U.S. Pat. Nos. 4,712,625, 4,780,867, 4,825,430 and 4,896,314, all being assigned to Optical Data Inc., USA. The rewritable type optical recording medium consists typically of three layers: a substrate, a recording layer and an erasing layer. While the recording layer comprises an elastic polymer resin and dye capable of absorbing a recording laser, the erasing layer comprises a thermoplastic polymer resin and dye capable of absorbing an erasing laser.

Reading of recorded information in the rewritable type optical recording medium is effected by using the difference between the reflectivity of the unrecorded portion and bumps upon irradiating a recording laser with a weak to medium power. However, the rewritable type optical recording medium possesses the characteristics of low reflectivity. There have been many attempts to improve the reflectivity of the dye itself dispersed in the recording layer (Japanese Patent Laid-Open Publication Nos. Sho. 58-112790, 62-146682 and Hei. 1-206093). It has been proven that there are, however, limitations in improving the reflectivity of the dye itself.

For erasure of data in the rewritable type optical recording medium, an erasing laser is initially focused on the erasing layer with a power sufficient to heat the erasing layer to not less than its glass transition temperature. As a result, the erasing layer is weakened in resistance to retention force of the recording layer, so that the recorded portion is restored to its original state by the retention force. In this regard, reliability should be taken into account for bump formation, in order to show appropriate information carrier to noise (C/N) ratios when using the medium repetitively. An improvement in the reliability was made in Japanese Patent Laid-Open Publication No. Sho. 63-207691, but it is believed that the patent has limited practical application to optical recording medium and requires a complicated apparatus because two different laser beams are used for writing and erasing data.

Currently, WORM type optical recording media are of disk shape in practice and have been intensively advanced in the fields including data storage disk, recordable CD-Audio and Photo CD. Related techniques are disclosed in Japanese Patent Laid-Open Publication Nos. Hei. 2-67183, 4-76836 and 4-102242, all assigned to Fuji Photo Film Co. Ltd., Japan; Japanese Patent Laid-Open Publication Nos. Hei. 2-24437, 2-273339, 2-312020, 3-66042, 3-203694, 3-224792, 4-25492 and 4-28588, all assigned to TDK Corp., Japan; Japanese Patent Laid-Open Publication Nos. Hei. 3-203690, 3-203691, 3-203692 and 3-203693, all assigned to Pioneer Electric Corp., Japan; Japanese Patent Laid-Open Publication Nos. Hei. 2-132649, 2-132654, 2-132656, 2-132657, 2-206093 and 2-84384 and U.S. Pat. No. 5,090,009, all assigned to Taiyo Yuden Corp., Japan; and Japanese Patent Laid-Open Publication Nos. Hei. 3-46135 and 4-70380, all assigned to Sony Corp.

CD-Rs, described in the just-mentioned patents, are recordable and characterized by readability in conventional CDP or CD-ROM drives. Their recording layers consist only of dye, which makes it difficult to improve the reflectivity of the disk and causes increases in production costs. A WORM type organic optical recording medium having a recording layer consisting of a dye-dispersed thermoplastic resin is also mentioned in the above-noted patents. Nowhere is there described CD compatibility of the WORM type organic optical recording medium, although there are examples of applying it to a disk. However, if it is applied for CD-compatible disks, there might be difficulty in selecting solvents for coating or in controlling the thickness of the recording layer. Nevertheless, effects such as low cost and improvement in reflectivity are expected to be brought about due to reduction in the amount of dye.

Commercially available existing CD-Rs, which have a recording layer consisting only of a dye layer, are recordable and readable in a CD drive. However, such CD-Rs have the characteristic that data recorded once are not erasable because it is of WORM type, which is impossible to erase. To provide erasability, CD-compatible inorganic type disks have been researched but are very expensive. In addition, there is a risk of data loss by oxidation. Owing to these reasons, such CDs are not generally available.

In the case of commercially available CD-Rs, on which data is recorded by a CD-R-exclusive recorder and which also has unrecorded portions, after recording on a recording apparatus, undesired data may be appended in the unrecorded and thus recordable portions by, for example, operator error or intentional operation. In spite of the security problems, such as data manipulation, annexation and so on, there are no readily available protective means that prevent rewrite of data. In addition, where the CD-Rs are repetitively read many times, there is a risk that data might be damaged by the recording laser.

In general, a recording medium using organic optical recording substance has an unavoidable, fatal drawback in durability. This drawback has been considerably minimized by virtue of technique development. However, in case of CD-Rs using dye alone, the dye is spontaneously discolored, which results in the loss of data.

BRIEF SUMMARY OF THE INVENTION

For solving the problems encountered in the prior art, the present inventors have recognized that there exist needs for the improvement in protection against data loss and data rewrite and in archival capability.

In accordance with an aspect of the present invention, there is provided a WORM type optical recording medium comprising a recording layer, a reflective layer and a protective layer which are formed in sequence on a substrate, the recording layer consisting of near infrared absorbing dye able to absorb a laser beam and to generate heat and of a thermosetting or photosetting resin.

In accordance with another aspect of the present invention, there is provided a method for the prevention of rewrite in an organic optical recording medium, comprising curing a recording layer consisting of a thermosetting or photocuring resin and a dye, which comprises heating up to 50° C. or irradiating with UV light, said dye being capable of absorbing near infrared rays and generating heat.

In the present invention, the near infrared absorbing dye is selected from the group consisting of cyanines, quinones, phthalocyanins and chroconiums. The cyanine dye is preferable represented by the following formula I:

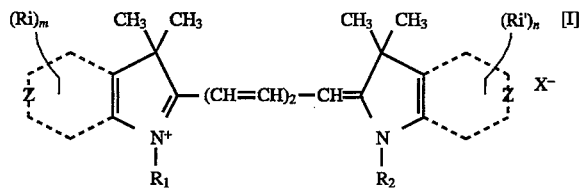

wherein

Z is a group to form a benzene ring or naphthalene ring;

$R_1$ and $R_2$ are each independently selected from the group consisting of alkyl, alkoxy, hydroxy, carbonyl, allyl and alkyl halide;

Ri and Ri' may be the same with or different from each other and each is a substituent selected from the group consisting of a hydrogen atom, a halogen atom, an alkyl group containing 2 to 5 carbon atoms and an alkoxy group containing 2 to 5 carbon atoms;

m and n are integers of 1 to 4, representing the number of substituent(s); and $X^-$ is an anion of a halogen atom, perchloric acid, alkyl sulfonic acid, or toluene sulfonic acid.

BRIEF DESCRIPTION OF THE DRAWINGS

The above object and other advantages of the present invention will become more apparent by describing in detail the preferred embodiments of the present invention with reference to the attached drawings in which.

DETAILED DESCRIPTION OF THE INVENTION

The applications of the preferred embodiments of the present invention are best understood with reference to the accompanying drawings.

Figure 1:
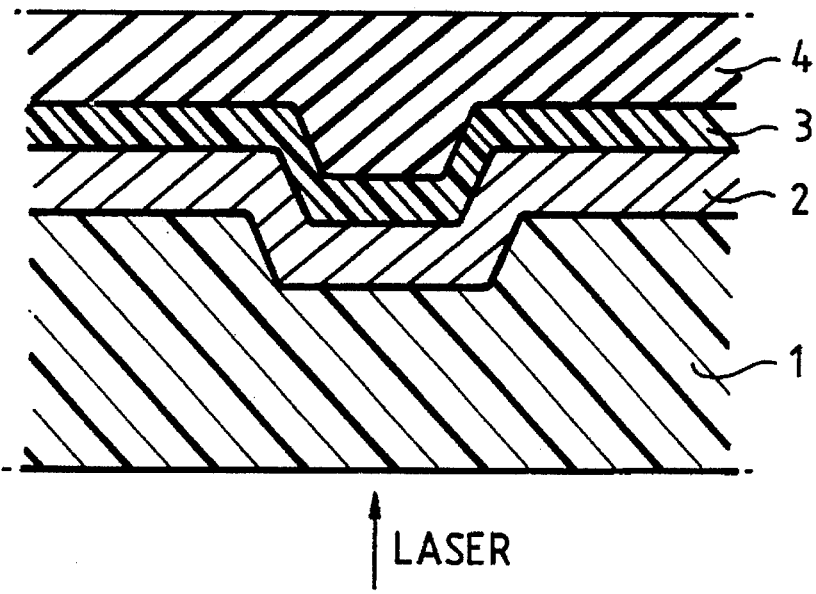
FIG. 1 is a schematic fragmentary cross-sectional view of an organic optical recording medium for disk, according to the present invention.

Referring initially to FIG. 1, there is shown an organic optical recording medium applied for disk, according to an embodiment of the present invention. As shown in this figure, the organic optical recording medium is structured to have a substrate 1 on which a recording layer 2 containing dye, a reflective layer 3 and a protective layer 4 are formed in sequence.

The recording layer 2 is formed of a curing resin which is crosslinked by heating or irradiation of light and which is selected from the group consisting of epoxy resins, acrylic resins, urethane resins and silicon resins. Preferably, the curing resin used in the present invention has the characteristic that its physical properties are easily transformed by heating before curing but transformed little by heating after curing due to development of high thermal deformation and decomposition temperatures by the curing.

A dye, dispersed in the curing resin, has the function of absorbing a recording laser and generating heat. To effect these functions, it is necessary for the dye to have a large absorption coefficient and high thermal stability. The amount of the dye in the recording layer 2 is preferably on the order of approximately 2 to approximately 40% by weight based on the weight of the curing resin. For example, if too little dye is used, heat is not readily generated, as a result of which the resin is insufficiently deformed. On the other hand, if too much dye is used, the reflectivity is considerably lowered.

With regard to the preparation procedure of optical recording medium for the disk, the dye of formula I and the curing resin are first dissolved in a solvent, such as toluene, hexane, butanone, methylcellosolve or diacetone alcohol, in an amount of approximately 1 to approximately 5% by weight based on the total weight of the solution. Then, the resulting solution is spin-coated on a substrate 1 of polycarbonate or amorphous polyolefin having pregrooves thereon, in a velocity of 1000 to 3000 rpm, so as to form a recording layer 2 which is 0.1 to 2 μm thick, as shown in FIG. 1. On this recording layer 2 is sputtered Au, Au-Pd alloy or Al in a thickness of approximately 1000 Å, so as to form a reflective layer 3. For completion of the disk, a UV-curing resin is overcoated on the reflective layer 3 in a thickness of approximately 10 μm, to form a protective layer 4.

It is required that the recording layer 2 have a thickness of 0.1 to 2 μm in order to record information and to read data. For example, if the recording layer 2 is too thick, the reflectivity is lowered so that recorded data is not read. On the other hand, if it is too thin, too little heat is generated to record information therein.

Figure 2:
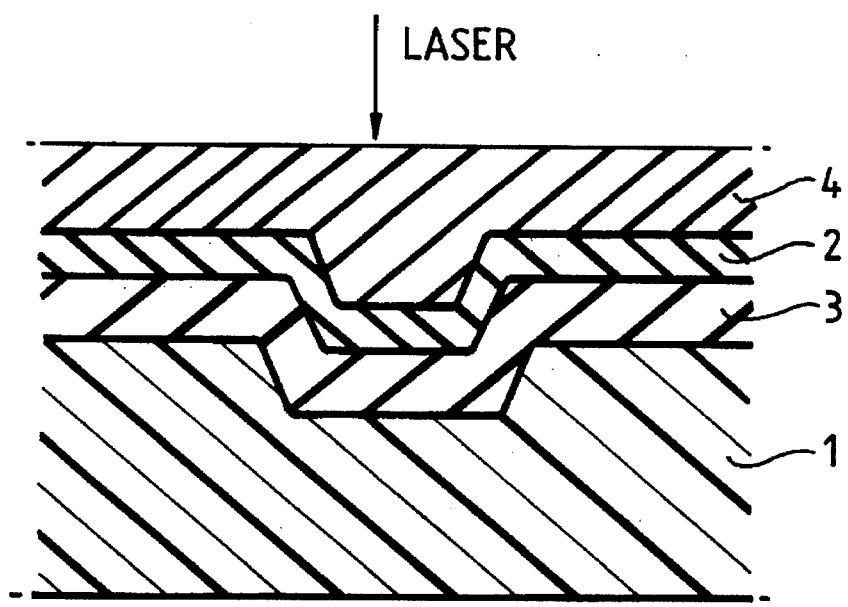
FIG. 2 is a schematic fragmentary cross-sectional view of an organic optical recording medium for tape, according to the present invention.

The organic optical recording medium according to the present invention can be applied onto tape. In this case, as shown in FIG. 2, aluminum is deposited over a 30 μm polyethyleneterephthalate film substrate 1 in a thickness of approximately 0.05 μm, to form a reflective layer 3. Separately, the above-mentioned dye and curing resin are dissolved in a solvent, such as toluene or cyclohexanone. This resulting solution is coated over the reflective layer 3 in a thickness of approximately 0.1 to approximately 2 μm, to form a recording layer 2 which is subsequently overcoated with silicon resin, to form a silicon type hard protective layer 4 having a thickness of approximately 0.1 to approximately 0.3 μm.

In preparing the optical recording media as mentioned above, the amount of the dye is preferably in a range of approximately 2 to approximately 40% by weight based on the weight of the resin used. The reason is that an excess of the dye deteriorates adhesion to the substrate and an shortage thereof lowers recording characteristics of the recording layer. In addition, it is preferred that the dye is added in the solvent in an amount of approximately 0.5 to approximately 5% by weight based on the weight of only solvent. For example, if the amount of the dye exceeds the upper limit, production cost is raised. On the other hand, if it is below the lower limit, the recording characteristic is lowered.

For writing data in the recording layer 2, a laser beam is focused on an area of the recording layer 2 with the dye absorbing the laser and generating heat. This heat deforms the local area of the recording layer 2, so that a pit of recording signal is formed. For reading the data recorded, there is used the same laser source of a recording laser which has a lower power than that for recording. Upon irradiating the recording laser to a surface of the disk, information is readout by difference of the reflectivity between unrecorded portions and the pit.

In addition to the recording which is accomplished by deforming a local area of the recording layer with the heat of the dye, the present invention is also characterized by crosslinking the resin of the recording layer in order to prevent rewrite after the recording. For this, the recording layer is exposed to a UV beam or heated to not less than 50° C., to cure the recording layer, thereby removing recording capacitance of the recording layer.

As described hereinbefore, disks made of the organic optical recording media of the present invention are capable of being used in drives for conventional disks. In addition to the compatibility, the disk of the present invention, which has dye dispersed in a recording layer, is advantageous in that reduction in amount of the dye improves optical transmissivity of the recording layer. Further, reflectivity of the disk of the present invention is generally higher than that of existing CD-Rs, by virtue of the reduction of the dye amount, so that, instead of gold (Au), a low-price metal, such as aluminum, may be employed in the reflective layer. This brings about economical advantages, along with lowered amounts of dye.

Since commercially available CD-Rs have a recording layer consisting only of dye, there is anxiety about data damage by reading lasers upon repetitive readout and about data loss by spontaneous discoloration of the dye. On the contrary, in case of the disk according to the present invention, since recording signals are inscribed in the curing resin by the dye, there is no damage to recorded information even if the dye is spontaneously discolored. Moreover, the recording layer of the present invention is crosslinked by a proper process, so that the recording layer itself has good durability. As emphasized above, the disk of the present invention, subjected to recording locking treatment, cannot be rewritten due to curing of the recording layer even if again exposed to a recording laser. Therefore, after recording data, the optical recording medium according to the present invention is protected from being rewritten by operator error or intentional manipulation.

The preferred embodiments of the present invention will now be further described with reference to specific examples.

Following are examples which illustrate procedures, including the best mode, for practicing the invention. These examples should not be construed as limiting. All percentages are by weight and all solvent mixture proportions are by volume unless otherwise noted.

EXAMPLES 1 THROUGH 3

An epoxy resin (trademark: EOCN 1020, commercially available from Nippon Kayaku Co., Ltd., Japan), a curing agent (trademark: PSM 4261, commercially available from Nippon Kayaku Co., Ltd., Japan) and a catalyst TPP were mixed at composition ratios given in the following Table 1. To this mixture was added 0.5 g of dye (commercially available from Nippon Kanko Shikiso Kenkyusho K. K., Japan), to give a solution. The solution was coated on an amorphous polyolefin substrate 1 (trademark: Zeonex 280, commercially available from Nippon Zeon Co., Ltd., Japan)

having pregrooves, to form a recording layer 1 with a thickness of 0.5 µm. For a reflective layer 3, Au was deposited in a thickness of 1000 Å. SD-17 (trademark, commercially available from Dainippon Ink & Chemicals Co., Ltd., Japan) was used for a protective layer 4 with a thickness of 10 µm.

The recording media thus obtained were recorded using an audio CD recorder (trademark: RPD-1000, commercially available from Pioneer Electric Corp., Japan) and then, subjected to thermal treatment at 70° C. for 30 minutes, to cure the recording layer for the purpose of preventing rewrite. Reading characteristics of the recorded media were evaluated by CD-CAT (trademark, commercially available from Studer Revox A. G.).

The media were tested for light stability by exposing to a light them 15 cm distant from a light source of xenon lamp with a power of 1.5 kw, for 20 hours and detecting the change of reflectivity. For evaluating temperature-moisture reliability, after they were left at 70° C. and at a humidity of 90% for 24 hours, changes in information carrier to noise (C/N) ratio were detected.

Results of the tests are given as shown in the following Table 1.

pletely cured by irradiating with the UV-curing lamp for several tens of minutes. Reading characteristics of the recorded media were evaluated by CD-CAT (trademark, commercially available from Studer Revox A. G.).

The media were tested for light stability and temperature-moisture reliability in the same manners with those of Example 1.

Results of the tests are given as shown in the following Table 2.

COMPARATIVE EXAMPLES 1 AND 2

Optical recording media were prepared in a similar manner to that of Example 1, except that recording layers with a thickness of 0.5 µm were formed using solutions containing only 0.40 g of dye given in the following Table 1 in 10 ml of methylcellosolve.

Results of the tests are given as shown in the following Table 1.

TABLE 1

| Substance & Test Results | Example Nos. | | | | |
|---|---|---|---|---|---|
| | 1 | 2 | 3 | C-1 | C-2 |
| Dye | NK-3219 | NK-3219 | NK-1836 | NK-3219 | NK-1836 |
| EOCN1020/PSM4261/TPP | 10/4/0.1 | 10/5/0/1 | 10/4/0.1 | — | — |
| C/N Ratio (dB) | 53 | 59 | 52 | 53 | 54 |
| *[1]C/N Ratio After Reliability Test | 52 | 56 | 52 | 51 | 55 |
| *[2]Reflectivity | 73 | 72 | 70 | 71 | 69 |
| *[3]Reflectivity After Light-Stability Test | 72 | 70 | 70 | 80 | 83 |
| *[4]C/N Ratio (dB) After $10^5$ Times Read | 53 | 58 | 51 | 50 | 50 |
| C/N Ratio After Light-Stability Test | 49 | 52 | 50 | 25 | 27 |

*[1]C/N ratio after left at 70° C. and at a humidity of 90%, for 24 hrs.
*[2]Reflectivity of unrecorded face.
*[3]Exposed to a light of Xe lamp with a power of 1.5 kw, 15 cm distant from object, for 20 hrs.
*[4]C/N ratio after repetitively reading.

EXAMPLES 4 THROUGH 6

10 g of an UV curing resin (trademark: Eb 264 and Eb 220, commercially available from Sunkyong UCB Corp., Korea, and trademark: M-1310, commercially available from Toa Gosey Chemical Industry Co., Ltd., Japan) was mixed with a photoinitiator (trademark: Darocure, commercially available from Ciba-Geigy Ltd.) amounting to 1% by weight of the resin. To this mixture was added 0.5 g of dye (commercially available from Nippon Kanko Shikiso Kenkyusho K. K., Japan), to give a solution. The solution was coated on an amorphous polyolefin substrate 1 (trademark: Zeonex 280, commercially available from Nippon Zeon Co., Ltd., Japan) having pregrooves, to form a recording layer 2 with a thickness of 0.5 µm. Subsequently, the recording layer 2 was exposed to a UV-curing lamp with a power of 1.3 kw for several seconds, to provide the recording layer with hardness, prior to formation of a reflective layer 3. For the reflective layer 3, Au was deposited in a thickness of 1000 Å. SD-17 (trademark, commercially available from Dainippon Ink & Chemicals Co., Ltd., Japan) was used for a protective layer 4 with a thickness of 10 µm.

To prevent the recording layer from being rewritten after write, the recording media, after being recorded, were com-

TABLE 2

| Substance & Test Results | Example Nos. | | |
|---|---|---|---|
| | 4 | 5 | 6 |
| Dye | NK-3219 | NK-3219 | NK-3219 |
| UV curing Resin | Eb 264 | Eb 220 | M-1310 |
| C/N Ratio (dB) | 52 | 57 | 51 |
| *[1]C/N Ratio After Reliability Test | 50 | 55 | 50 |
| *[2]Reflectivity | 74 | 72 | 71 |
| *[3]Reflectivity After Light-Stability Test | 72 | 70 | 71 |
| *[4]C/N Ratio (dB) After $10^5$ Times Read | 51 | 57 | 50 |
| C/N Ratio After Light-Stability Test | 48 | 53 | 49 |

*[1]C/N ratio after left at 70° C. and at a humidity of 90%, for 24 hrs.
*[2]reflectivity of unrecorded face.
*[3]exposed to a light of Xe lamp with a power of 1.5 kw, 15 cm distant from object, for 20 hrs.
*[4]C/N ratio after repetitively reading.

As apparent from the tables, the organic optical recording media according to the present invention exhibit stable reading characteristics of at least 45 dB even after irradiating a light with a short wavelength, relative to not more than 30 dB of conventional recording media which employ a recording layer consisting only of dye. The organic optical recording media of the present invention have also a function of record locking by curing the resin of recording layer, so that, once recorded, rewrite or additional recording is not allowed therein.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A WORM type organic optical recording medium comprising a substrate,
   a recording layer, a reflective layer and a protective layer, wherein the recording layer is between 0.1 and less than 2 μm thick, wherein said recording layer consists of a thermosetting or photocuring resin and near infrared absorbing dye capable of absorbing a laser beam and of generating heat, wherein said infrared absorbing dye is selected from the group consisting of cyanines, quinones, pthalocyanines, and chroconiums, and wherein said near infrared absorbing dye is dispersed in said resin of said recording layer in an amount of 2 to 40% by weight based on the weight of said resin.

2. A WORM type organic optical recording medium, according to claim 1, wherein said cyanine type dye is represented by the following formula I:

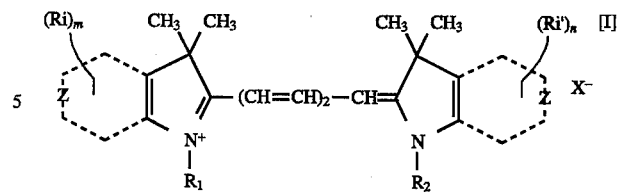

wherein

Z is a group to form a benzene ring or naphthalene ring;

$R_1$ and $R_2$ are each independently selected from the group consisting of alkyl, alkoxy, hydroxy, carbonyl, allyl and alkyl halide;

Ri and Ri' may be the same with or different from each other and each is a substituent selected from the group consisting of a hydrogen atom, a halogen atom, an alkyl group containing 2 to 5 carbon atoms and an alkoxy group containing 2 to 5 carbon atoms;

m and n are integers of 1 to 4, representing the number of substituent(s); and $X^-$ is an anion of a halogen atom, perchloric acid, alkyl sulfonic acid, or toluene sulfonic acid.

3. A WORM type organic optical recording medium, according to claim 1, wherein said medium is of disk type in which said recording layer, said reflective layer and said protective layer are formed in sequence over said substrate.

4. A WORM type organic optical recording medium, according to claim 1, wherein said medium is of tape type in which said reflective layer, said recording layer, and said protective layer are formed in sequence over said substrate.

* * * * *

UNITED STATES PATENT AND TRADEMARK OFFICE
CERTIFICATE OF CORRECTION

PATENT NO. : 5,645,907
DATED : July 8, 1997
INVENTOR(S) : Jung Hoi Kim, Young Jae Heo and Tae Young Nam It is certified that error appears in the above-indentified patent and that said Letters Patent is hereby corrected as shown below:

Column 7, line 1: "layer 1" should read --layer 2--.

Column 9, line 4: "fight" should read --light--

Signed and Sealed this

Twenty-eighth Day of October, 1997

Attest:

BRUCE LEHMAN

Attesting Officer

Commissioner of Patents and Trademarks